US012728649B2

(12) United States Patent
Kimura

(10) Patent No.: US 12,728,649 B2
(45) Date of Patent: Sep. 8, 2026

(54) IMAGE FORMING APPARATUS STABILIZING A PRINTING MEDIUM SURFACE TEMPERATURE

(71) Applicant: Konica Minolta, Inc., Tokyo (JP)

(72) Inventor: Kazuyoshi Kimura, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 122 days.

(21) Appl. No.: 18/665,360

(22) Filed: May 15, 2024

(65) Prior Publication Data

US 2024/0391253 A1 Nov. 28, 2024

(30) Foreign Application Priority Data

May 23, 2023 (JP) ................................ 2023-084507

(51) Int. Cl.
*B41J 11/00* (2006.01)

(52) U.S. Cl.
CPC ...... *B41J 11/0005* (2013.01); *B41J 11/00212* (2021.01)

(58) Field of Classification Search
CPC .... B41J 11/0005; B41J 11/00212; B41J 3/60; B41J 11/0021; B41J 13/0045; B41J 11/002
See application file for complete search history.

(56) References Cited

U.S. PATENT DOCUMENTS

2015/0367654 A1 12/2015 O'Neil et al.
2018/0186148 A1* 7/2018 Ito .......................... B41J 13/223
2018/0244079 A1* 8/2018 Boland .................. F26B 13/18

FOREIGN PATENT DOCUMENTS

JP 2021-094773 A 6/2021

OTHER PUBLICATIONS

EPO, European Search Report, issued on Oct. 10, 2024 for the related European patent application No. 24173269.2, 9 pages.
Office Action, dated Apr. 29, 2026, which was issued for the corresponding European Patent Application No. 24 173 269.2, 5 pages.

* cited by examiner

*Primary Examiner* — Bradley W Thies
(74) *Attorney, Agent, or Firm* — LUCAS & MERCANTI, LLP

(57) ABSTRACT

An image forming apparatus includes: a conveyor that conveys a recording medium while carrying the recording medium; an image former that forms an image on the recording medium conveyed by the conveyor; and a feeder that feeds the recording medium to the conveyor. The feeder includes a first heater that heats the recording medium from a first surface side on which the image is formed, and a second heater that heats the recording medium from a second surface side opposite to the first surface.

15 Claims, 4 Drawing Sheets

FIG.4

T1

| SURFACE TEMPERATURE OF SECOND WARMING CYLINDER | | HIGH-QUALITY SHEET | COATED SHEET UP TO 0.15 mm THICKNESS | COATED SHEET UP TO 0.3 mm THICKNESS | ART SHEET UP TO 0.15 mm THICKNESS | ART SHEET UP TO 0.3 mm THICKNESS | ART SHEET UP TO 0.6 mm THICKNESS |
|---|---|---|---|---|---|---|---|
| TARGET TEMPERATURE OF SECOND SURFACE | | – | 40 | | 40 | | |
| ROOM TEMPERATURE OR SHEET TEMPERATURE | 16 | 30 | 51 | 53 | 61.2 | 63.3 | 65.3 |
| | 20 | 30 | 47 | 49 | 57 | 59.1 | 61.1 |
| | 24 | 30 | 43 | 45 | 52.8 | 54.9 | 56.9 |
| | 28 | 30 | 39 | 41 | 48.6 | 50.7 | 52.7 |
| | 32 | 30 | 35 | 37 | 44.4 | 46.5 | 48.5 |

FIG.5

T2

| SURFACE TEMPERATURE OF FIRST HEATING CYLINDER | | HIGH-QUALITY SHEET UP TO 0.15 mm THICKNESS | HIGH-QUALITY SHEET UP TO 0.3 mm THICKNESS | COATED SHEET UP TO 0.15 mm THICKNESS | COATED SHEET UP TO 0.3 mm THICKNESS | ART SHEET UP TO 0.15 mm THICKNESS | ART SHEET UP TO 0.3 mm THICKNESS | ART SHEET UP TO 0.6 mm THICKNESS |
|---|---|---|---|---|---|---|---|---|
| TARGET TEMPERATURE OF FIRST SURFACE | | 38 | | 45 | | 45 | | |
| ROOM TEMPERATURE OR SHEET TEMPERATURE | 16 | 56 | 58 | 63 | 65 | 66 | 68 | 72 |
| | 20 | 52 | 54 | 59 | 61 | 62 | 64 | 68 |
| | 24 | 48 | 50 | 55 | 57 | 58 | 60 | 64 |
| | 28 | 44 | 46 | 51 | 53 | 54 | 56 | 60 |
| | 32 | 40 | 42 | 47 | 49 | 49 | 51 | 55 |

FIG.6

| BASIS WEIGHT | | HIGH-QUALITY SHEET, PLAIN SHEET | COATED SHEET | SINGLE-SIDED COATED SHEET, PET FILM, ART SHEET |
|---|---|---|---|---|
| THICKNESS | 0.15 mm | UP TO 128 gsm | UP TO 158 gsm | UP TO 128 gsm |
| | 0.3 mm | UP TO 209 gsm | UP TO 300 gsm | UP TO 256 gsm |
| | 0.6 mm | – | – | UP TO 450 gsm |

IMAGE FORMING APPARATUS STABILIZING A PRINTING MEDIUM SURFACE TEMPERATURE

CROSS-REFERENCE TO RELATED APPLICATIONS

The entire disclosure of Japanese Patent Application No. 2023-084507, filed on May 23, 2023, including description, claims, drawings and abstract is incorporated herein by reference.

BACKGROUND OF THE INVENTION

Technical Field

The present invention relates to an image forming apparatus.

Description of Related Art

In recent years, inkjet recording apparatuses have been widely used as apparatuses that record high-definition images on various recording media such as paper and fabric. An inkjet recording apparatus is an apparatus that records an image on a recording medium by a method of ejecting ink from nozzles of inkjet heads.

Meanwhile, the inkjet recording apparatus performs various temperature controls in order to secure the quality of a printed image. For example, the inkjet recording apparatus controls the temperatures of ink, a tank storing the ink, a head, a recording medium (sheet), and various components in the apparatus. The temperature control of the recording medium is important for ensuring and uniformizing the spreadability of the ink ejected and landed on the recording medium from the heads. In particular, when forming an image on each of the front and back surfaces of the recording medium, the inkjet recording apparatus needs to sufficiently perform the temperature control in each of the front and back surfaces of the recording medium.

Therefore, a configuration is disclosed in which a cylinder (conveyance roller) for temperature adjustment of the front face and a cylinder for temperature adjustment of the back face are provided (see, for example, JP 2021-94773A). The configuration described in JP 2021-94773A can perform temperature control in each of the front and back surfaces of the recording medium.

SUMMARY OF THE INVENTION

However, the configuration described in JP 2021-94773A cannot have solved the problem for a special recording medium. For example, since a thick sheet has a large heat capacity, heat transfer from a heating surface to an opposite surface side occurs. This causes a decrease in the temperature of the heating surface of the thick sheet at the start of printing, causing a phenomenon in which the temperature is not easily stabilized. In order to compensate for the decrease in the temperature of the heating surface of the recording medium, the inkjet recording apparatus needs to increase a heating amount of the recording medium. In particular, the inkjet recording apparatus is required to rapidly increase the temperature of one side of the recording medium in a short time in order to respond to increasingly higher speed of image recording. When the inkjet recording apparatus rapidly increases the temperature of one side of the recording medium in a short time, this causes sheet distortion such as curling and tight edges. The sheet distortion causes problems such as occurrence of sheet jams and destabilization of attraction of the recording medium to the printing cylinder.

The present invention has an object to provide an image forming apparatus capable of stabilizing a sheet surface temperature while suppressing occurrence of curling.

To achieve at least one of the abovementioned objects, according to an aspect of the present invention, an image forming apparatus reflecting one aspect of the present invention includes:

a conveyor that conveys an recording medium while carrying the recording medium;

an image former that forms an image on the recording medium conveyed by the conveyor;

a feeder that feeds the recording medium to the conveyor, wherein the feeder includes a first heater that heats the recording medium from a first surface side on which the image is formed, and a second heater that heats the recording medium from a second surface side opposite to the first surface.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein:

FIG. 4 is a diagram showing an example of a temperature adjustment table of a second heating cylinder;

FIG. 5 is a diagram showing an example of a temperature adjustment table of a first heating cylinder; and FIG. 6 is a diagram showing an example of a condition of the basis weight allowed in the normal control with respect to the thickness of the recording medium.

DETAILED DESCRIPTION

Hereinafter, one or more embodiments of the present invention will be described with reference to the drawings. However, the scope of the invention is not limited to the disclosed embodiments.

Figure 1:
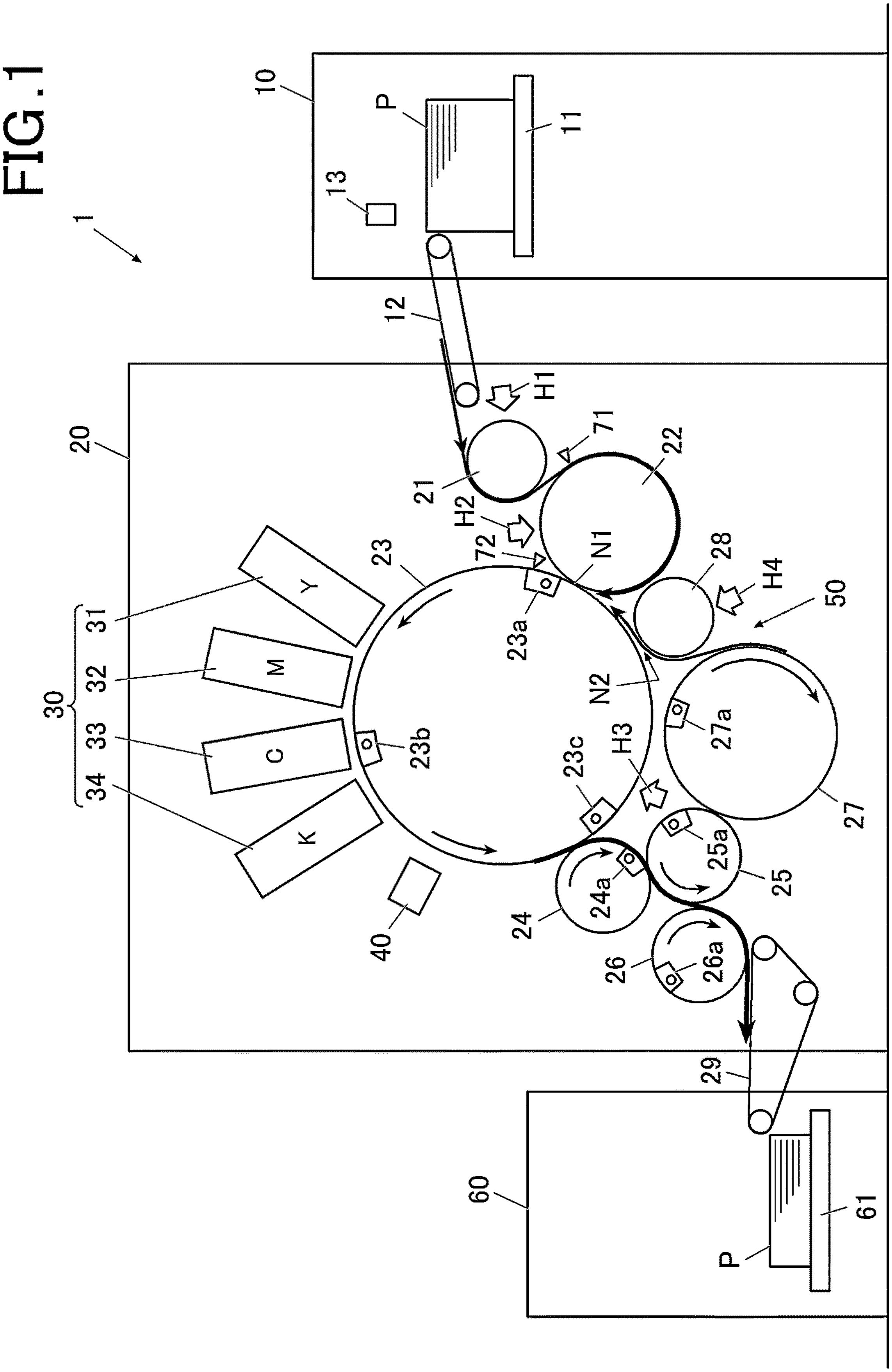
FIG. 1 is a side view explaining a schematic configuration of an inkjet recording apparatus according to the present embodiment.
Figure 2:
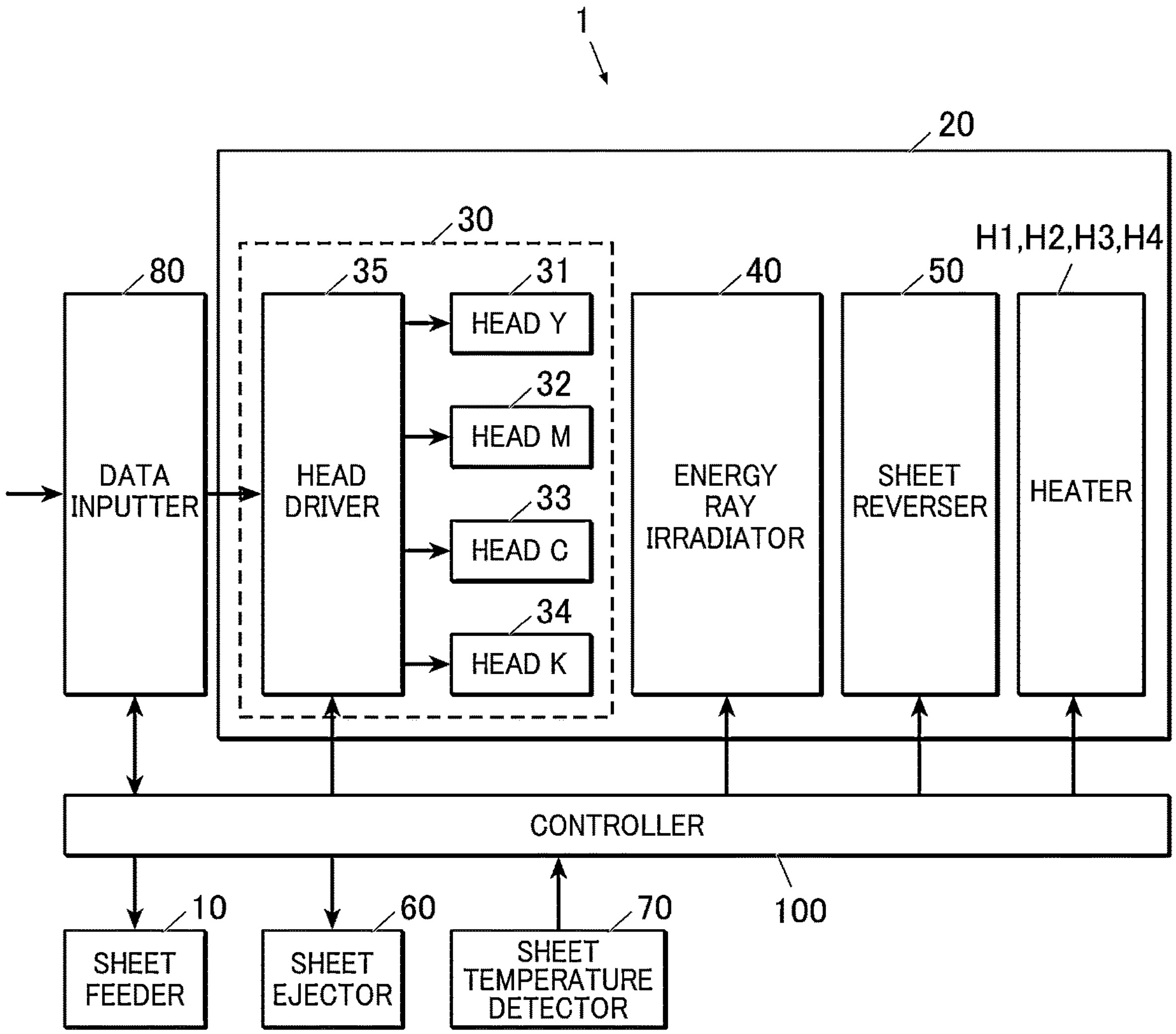
FIG. 2 is a block diagram for explaining main functions of the inkjet recording apparatus according to the present embodiment.

As illustrated in FIGS. 1 and 2, an inkjet recording apparatus (image forming apparatus) 1 according to the present embodiment includes a sheet feeder 10, a main body 20, a sheet ejector 60, a sheet temperature detector 70, a data inputter 80, and a controller 100 (i.e., a hardware processor).

The sheet feeder 10 feeds a recording medium (sheet) P to a second heating cylinder 21 of the main body 20.

The sheet feeder 10 includes a sheet feeding tray 11, a medium feeder 12, and a temperature sensor 13.

The sheet feeding tray 11 is a plate-like member on which one or more recording media P can be placed, and stores the recording media P. The sheet feeding tray 11 is provided so as to move up and down according to the amount (number) of recording media P placed on the sheet feeding tray 11. The sheet feeding tray 11 is held at a position where the uppermost recording medium P is conveyed by the medium feeder 12 in the up and down movement direction.

The medium feeder 12 includes an annular belt whose inner side is supported by two rollers. The medium feeder 12 rotates the rollers with the recording medium P placed on the belt. In this way, the medium feeder 12 conveys and feeds the recording medium P from the sheet feeding tray 11 to the main body 20.

The temperature sensor 13 is, for example, an infrared detection sensor and measures the temperature of the recording medium P during a sheet feeding operation. The temperature sensor 13 is positioned so as to face the uppermost recording medium P, and outputs, to the controller 100, the measured temperature of the uppermost recording medium P as a detection signal.

The main body 20 includes a plurality of cylinders. In the present embodiment, the cylinder refers to a conveyance roller that conveys the recording medium P.

To be specific, the main body 20 includes the second heating cylinder 21, a first heating cylinder 22, a printing cylinder 23, a first sheet ejection cylinder 24, a conveyance cylinder 25, a second sheet ejection cylinder 26, a reversing cylinder 27, and a third heating cylinder 28. The printing cylinder 23 has a large diameter (e.g., a triple-sized cylinder).

The second heating cylinder 21 holds the recording medium P conveyed by the medium feeder 12 on the conveyance surface and delivers the recording medium P to the first heating cylinder 22. That is, the second heating cylinder 21 is arranged on the upstream side in the conveyance direction of the recording medium P relative to the first heating cylinder 22.

In the main body 20, a heater H1 for heating the second heating cylinder 21 is provided at a position facing the second heating cylinder 21. That is, the heater H1 (radiant heat source) for heating the second heating cylinder 21 is provided on the outer circumferential side of the second heating cylinder 21. The heater H1 operates under the control of the controller 100, and radiates heat for warming (preheating) the second heating cylinder 21. Thereby, the second heating cylinder 21 is heated, and heats a second surface of the recording medium P being conveyed, prior to an image forming process. The second surface of the recording medium P is a surface on which an image is formed on the recording medium P conveyed to the printing cylinder 23 via a sheet reverser 50. The second surface is a surface opposite to a first surface to be described later. That is, the second heating cylinder 21 functions as a second heater of the present invention which heats the recording medium P from the second surface side which is opposite to the first surface.

The first heating cylinder 22 is provided at a position between the second heating cylinder 21 and the printing cylinder 23. The first heating cylinder 22 holds the recording medium P conveyed by the second heating cylinder 21 on the conveyance surface, and delivers the recording medium P to the printing cylinder 23.

In the main body 20, a heater H2 for heating the first heating cylinder 22 is provided at a position facing the first heating cylinder 22. The heater H2 operates under the control of the controller 100, and radiate heat for warming the first heating cylinder 22. Thereby, the first heating cylinder 22 is heated, and heats the first surface of the recording medium P being conveyed prior to the image forming process. The first surface of the recording medium P is a surface on which an image is formed on the recording medium P conveyed to the printing cylinder 23 via the second heating cylinder 21. That is, the first heating cylinder 22 functions as a first heater of the present invention which heats the recording medium P from the first surface side on which an image is formed.

The printing cylinder (conveyor) 23 rotates in a counterclockwise direction while carrying the recording medium P delivered by the first heating cylinder 22 on a cylindrical outer circumferential curved surface (conveyance surface). Thereby, the printing cylinder 23 conveys the recording medium P in the counterclockwise direction.

In the main body 20, a heater H3 for heating the printing cylinder 23 is provided at a position facing the printing cylinder 23. The heater H3 operates under the control of the controller 100, and radiates heat for warming the printing cylinder 23. Thereby, the printing cylinder 23 is heated, and heats the recording medium P being conveyed.

The printing cylinder 23 includes a plurality of claws 23*a*, 23*b*, and 23*c* and an intake unit (not illustrated) in order to carry the recording medium P on the conveyance surface. The end of the recording medium P is pressed by any of the claws 23*a* to 23*c* and the recording medium P is attracted to the conveyance surface by the intake unit. Thereby, the recording medium P is carried on the conveyance surface of the printing cylinder 23.

The sheet feeder 10, the second heating cylinder 21, and the first heating cylinder 22 function as a feeder of the present invention that feeds the recording medium P to the printing cylinder 23.

The main body 20 further includes an image former 30, an energy ray irradiator 40, and a sheet reverser 50.

The image former 30 forms an image on the recording medium P conveyed by the printing cylinder 23.

The image former 30 includes a plurality of inkjet heads (hereinafter, also simply referred to as heads) 31 to 34 and a head driver 35.

The plurality of heads 31 to 34 eject inks having mutually different colors. The heads 31 to 34 form an image by ejecting the inks onto the recording medium P from respective nozzle openings at timings according to the rotation of the printing cylinder 23 on which the recording medium P is carried. The nozzle openings are provided in respective ink ejection surfaces facing the conveyance surface of the printing cylinder 23. The heads 31 to 34 are arranged such that their ink ejection surfaces and the conveyance surface of the printing cylinder 23 are spaced apart from each other by a predetermined distance.

In the example shown in FIG. 1, it is assumed that ultraviolet (UV) curable ink is ejected from each of the heads 31 to 34. Note that the ink used in the image former 30 is not limited thereto. For example, the inks used in the image former 30 may have a property of being dried or cured by irradiation with other energy rays such as infrared rays or an electron beam.

Four heads 31 to 34 correspond to the respective inks of yellow (Y), magenta (M), cyan (C), and black (K). In the example shown in FIG. 1, the four heads 31 to 34 are arranged at predetermined intervals in the order of the colors of Y, M, C, and K from the upstream side in the conveyance direction of the recording medium P. Hereinafter, the conveyance direction of the recording medium P is also simply referred to as a conveyance direction.

Although not illustrated, in one specific example, each of the heads 31 to 34 is provided with a plurality of recording elements. The plurality of recording elements each include a pressure chamber that stores ink, a piezoelectric element provided on a wall surface of the pressure chamber, and a nozzle communicating with the pressure chamber. In the recording element, when a drive signal for deforming the piezoelectric element is input, the pressure chamber is deformed and the pressure in the pressure chamber changes, causing ink to be ejected from the nozzle.

The head driver 35 drives the plurality of heads 31 to 34 at an appropriate timing under the control of the controller 100. To be specific, the head driver 35 supplies, to each of the heads 31 to 34, a driving signal for deforming the piezoelectric element according to image data. Thereby, the head driver 35 causes the nozzle corresponding to each of the heads 31 to 34 to eject ink in an amount corresponding to a pixel value of the image data.

The energy ray irradiator 40 is arranged on the downstream in the conveyance direction of the image former 30. The energy ray irradiator 40 includes a light emitter arranged over the width of the printing cylinder 23 in the direction of the rotation axis. The light emitter irradiates the recording medium P placed on the printing cylinder 23 with energy rays such as ultraviolet rays. The energy ray irradiator 40 irradiates the recording medium P with energy rays from the light emitter to warm the ink ejected onto the recording medium P to a predetermined temperature. Thereby, the energy ray irradiator 40 cures the image (ink image) formed on the recording medium P and fixes the image on the recording medium P.

The first sheet ejection cylinder 24, the conveyance cylinder 25, the second sheet ejection cylinder 26, the reversing cylinder 27, and a belt conveyor 29 are provided on the downstream side in the conveyance direction of the energy ray irradiator 40. The first sheet ejection cylinder 24 faces the printing cylinder 23. The conveyance cylinder 25 faces the first sheet ejection cylinder 24. The second sheet ejection cylinder 26 and the reversing cylinder 27 face the conveyance cylinder 25. The belt conveyor 29 faces the second sheet ejection cylinder 26.

The third heating cylinder 28 is provided on the downstream side in the conveyance direction of the reversing cylinder 27. The third heating cylinder 28 forms a nip with the printing cylinder 23, holds the trailing edge of the recording medium P conveyed by the reversing cylinder 27 at the nip, and conveys the recording medium P.

In the main body 20, a heater H4 for heating the third heating cylinder 28 is provided at a position facing the third heating cylinder 28. That is, the heater H4 (radiant heat source) for heating the third heating cylinder 28 is provided on the outer circumferential side of the third heating cylinder 28. The heater H4 operates under the control of the controller 100, and radiate heat for warming the third heating cylinder 28. Thereby, the third heating cylinder 28 is heated, and heats the second surface of the recording medium P that has been reversed by the sheet reverser 50. That is, the third heating cylinder 28 functions as a third heater of the present invention that heats, from the second surface side, the recording medium P that has been reversed by the sheet reverser 50.

Among the above, the reversing cylinder 27 and the third heating cylinder 28 reverse the recording medium P in which an image is formed on the first surface by the image former 30, and convey the recording medium P to the printing cylinder 23. That is, the reversing cylinder 27 and the third heating cylinder 28 constitute a sheet reverser (reverser) 50 of the present invention.

In the present embodiment, the cooperative operation of the reversing cylinder 27 that performs so-called switchback rotation operation and the third heating cylinder 28 implements the function of the sheet reverser 50.

The sheet reverser 50 conveys the recording medium P heated by the third heating cylinder 28 to a nip N1 formed by the printing cylinder 23 and the first heating cylinder 22.

In the present embodiment, the recording material P conveyed to the first heating cylinder 22 via the second heating cylinder 21 has a longer contact length with the first heating cylinder 22 than the recording material P conveyed to the first heating cylinder 22 (nip N1) via the third heating cylinder 28. This is because, in a case where the recording medium P passes through the third heating cylinder 28, the recording medium P is heated to some extent by heating or the like by the printing cylinder 23 or the energy ray irradiator 40. That is, in a case where the recording medium P passes through the third heating cylinder 28, the recording medium P only needs to be slightly heated, and thus a contact distance with the first heating cylinder 22 is reduced. The contact time of the recording medium P with the first heating cylinder 22 varies according to the contact distance with the first heating cylinder 22. That is, in a case where the recording medium P passes through the second heating cylinder 21, a contact distance with the first heating cylinder 22 increases, and therefore, a contact time with the first heating cylinder 22 also increases. Thereby, the recording medium P passing through the second heating cylinder 21 is gently heated over time, thereby suppressing the occurrence of sheet distortion.

The first sheet ejection cylinder 24, the conveyance cylinder 25, the second sheet ejection cylinder 26, and the reversing cylinder 27 are provided with claws 24*a*, 25*a*, 26*a*, and 27*a*, respectively. Each of the claws 24*a* to 27*a* is switched between opening and closing under the control of the controller 100.

The belt conveyor 29 includes an annular conveyance belt whose inner side is supported by three rollers. The belt conveyor 29 conveys the recording medium P delivered from the conveyance cylinder 25 and the second sheet ejection cylinder 26 by a conveyance belt, and sends the recording medium P to the sheet ejector 60.

The sheet ejector 60 ejects the recording medium P on which an image has been formed by the image former 30. The sheet ejector 60 includes a plate-shaped sheet ejection tray 61 on which the recording medium P sent from the main body 20 by the belt conveyor 29 is placed.

The sheet temperature detector 70 includes a plurality of temperature sensors, and outputs detection results of the temperature sensors to the controller 100. To be specific, the sheet temperature detector 70 includes the temperature sensor 13, a temperature sensor 71, and a temperature sensor 72.

The temperature sensor 71 is arranged on the downstream side in the conveyance direction of the second heating cylinder 21 and on the upstream side in the conveyance direction of the printing cylinder 23 so as to face the first heating cylinder 22. The temperature sensor 71 detects the temperature of the second surface side of the recording medium P after heating by the second heating cylinder 21, and outputs the detection result to the controller 100. Note that the temperature sensor 71 can also detect the temperature of the first heating cylinder 22 when the recording medium P is not passing therethrough.

The temperature sensor 72 is arranged on the downstream side in the conveyance direction of the first heating cylinder 22 and on the upstream side in the conveyance direction of the image former 30 so as to face the printing cylinder 23. The temperature sensor 72 detects the temperature of the first surface side of the recording medium P after heating by the first heating cylinder 22, and outputs the detection result to the controller 100. Note that the temperature sensor 72 can also detect the temperature of the printing cylinder 23 when the recording medium P is not passing therethrough.

The data inputter 80 includes an input interface connected to an external device such as a PC (not illustrated), a memory, and the like. As the memory, for example, an HDD is used, and a DRAM or the like may be used in combination.

The data inputter 80 acquires (inputs and stores) data relating to a print job from the external device under the control of the controller 100. The data relating to the print job includes a job command, image data of an image to be printed, and various types of setting data. The data inputter 80 outputs the image data to the head driver 35 when a print job is executed.

The controller 100 includes a CPU (Central Processing Unit), a RAM (Random Access Memory), and a ROM (Read Only Memory).

The CPU reads various control programs and setting data items stored in the ROM, stores the read programs and data items in the RAM, and executes the programs to perform various arithmetic processes. The CPU comprehensively controls the overall operation of the inkjet recording apparatus 1.

The RAM provides a working memory space for the CPU and stores temporary data. Note that the RAM may include a non-volatile memory.

The ROM stores various control programs to be executed by the CPU, setting data, and the like. Note that instead of the ROM, a rewritable nonvolatile memory such as an EEPROM or a flash memory may be used.

For example, the controller 100 switches the conveyance direction (conveyance path or conveyance destination) of the recording medium P by controlling the opening and closing of the claws 23*a* to 27*a* of the respective cylinders 23 to 27.

Furthermore, the controller 100 controls heating by the first heating cylinder 22, the second heating cylinder 21, and the third heating cylinder 28.

In addition, the controller 100 acquires information relating to the recording medium P on the basis of data relating to a print job or information detected by various sensors (not illustrated). Examples of the information relating to the recording medium P include a material, a basis weight, thickness information, a sheet width, and an ink adhesion amount of the recording medium P.

Figure 3:
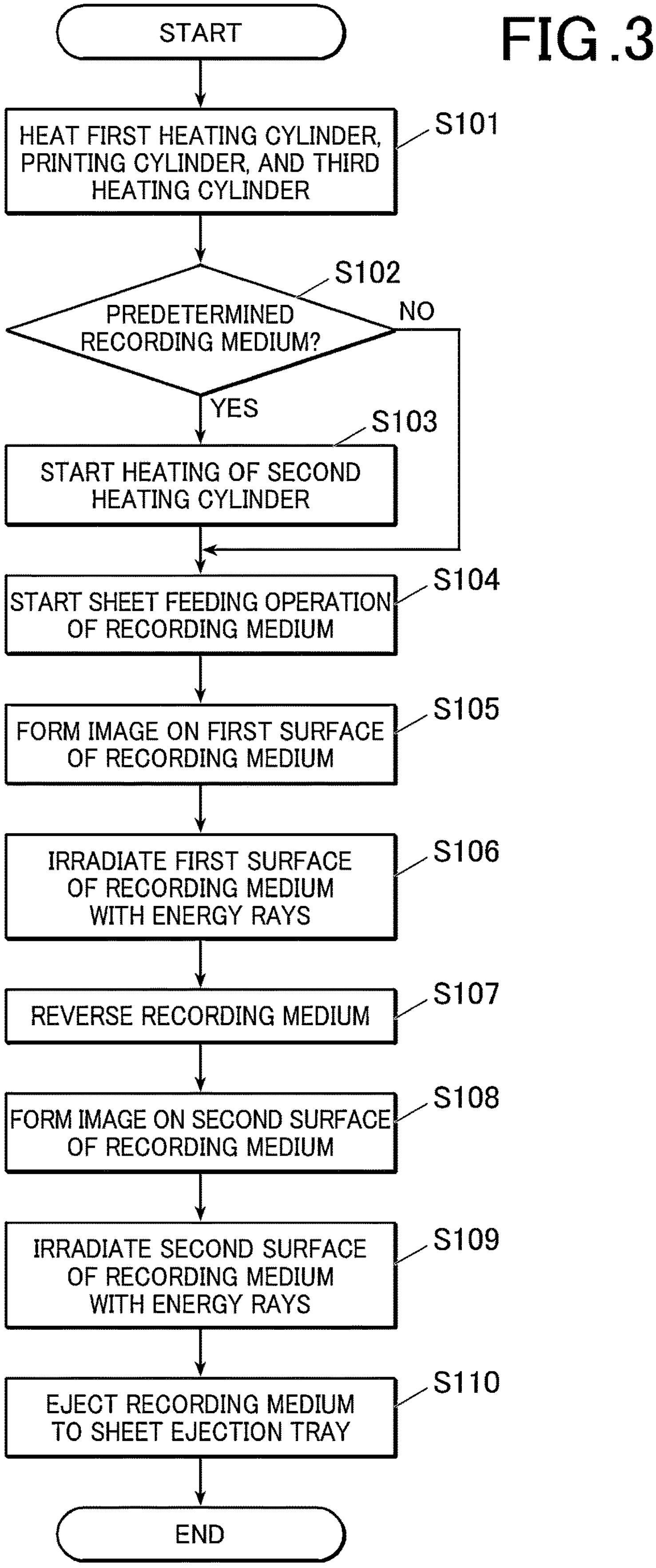
FIG. 3 is a flowchart showing an example of the operation of the inkjet recording apparatus according to the present embodiment.

Next, the operation of the inkjet recording apparatus 1 according to the present embodiment will be described with reference to the flowchart of FIG. 3. The processing of FIG. 3 is processing when double-sided printing is instructed in the inkjet recording apparatus 1. Note that the processing of FIG. 3 is started when execution of a print job is instructed.

First, the controller 100 performs control to heat the first heating cylinder 22, the printing cylinder 23, and the third heating cylinder 28 by operating the heater H2, the heater H3, and the heater H4 (step S101). That is, the controller 100 controls heating by the first heating cylinder 22, the printing cylinder 23, and the third heating cylinder 28.

Next, the controller 100 determines whether or not the recording medium P on which an image is to be formed by the image former 30 is a predetermined recording medium (step S102). The predetermined recording medium is a medium having a large heat capacity. Examples of the predetermined recording medium include a PET film, a coated sheet, an art sheet, a single-sided coated sheet, and a cast-coated sheet. In general, as the thickness of the recording medium increases, the heat accumulated in the pulp layer is less likely to escape. Therefore, regardless of the sheet type, a recording medium having a large thickness may be included in the predetermined recording media. The controller 100 determines whether or not the recording medium is a predetermined recording medium, for example, with reference to data relating to a print job and information detected by various sensors.

If determining that the recording medium is the predetermined recording medium (step S102: YES), the controller 100 proceeds to step S103.

On the other hand, if determining that the recording medium is not the predetermined recording medium (step S102: NO), the controller 100 proceeds to step S104.

In step S103, the controller 100 operates the heater H1 to start the control of heating the second heating cylinder 21. That is, if an image is formed on the predetermined recording medium by the image former 30, the controller 100 starts the control of heating by the second heating cylinder 21. Thereafter, the controller 100 proceeds to step S104. The reason why the control to heat the second heating cylinder 21 is started is that the heat of the recording medium having a large heat capacity is likely to escape from the heating surface (first surface) to the opposite surface (second surface). That is, the controller 100 causes the second heating cylinder 21 to heat the second surface side before the first heating cylinder 22 heats the first surface. This prevents heat on the heating surface (first surface) side from escaping to the opposite surface (second surface).

In step S104, the controller 100 controls the sheet feeder 10 to start the sheet feeding operation of the recording medium P. The recording medium P fed from the sheet feeder 10 is conveyed to the printing cylinder 23 via the second heating cylinder 21 and the first heating cylinder 22. At that time, the second surface of the recording medium P is heated by the second heating cylinder 21, and the first surface is heated by the first heating cylinder 22.

Next, the controller 100 controls the image former 30 to form an image (ink image) on the first surface of the recording medium P (step S105).

Next, the controller 100 controls the energy ray irradiator 40 to irradiate the first surface of the recording medium P on which the image is formed, with energy rays (step S106). The recording medium P irradiated with the energy rays is conveyed to the reversing cylinder 27 via the first sheet ejection cylinder 24 and the conveyance cylinder 25.

Next, the controller 100 controls the sheet reverser 50 to reverse the recording medium P conveyed to the reversing cylinder 27 (step S107).

To be specific, the controller 100 reverses the rotation direction of the reversing cylinder 27 when the trailing edge in the conveyance direction of the recording medium P held by the claw 27*a* of the reversing cylinder 27 reaches a position facing the third heating cylinder 28. By this switch-back operation, the trailing edge in the conveyance direction of the recording medium P is delivered to and held in the nip between the printing cylinder 23 and the third heating cylinder 28. At this time, the controller 100 performs control to open the claw 27*a* of the reversing cylinder 27, to release the holding of the recording medium P by the reversing cylinder 27. Such control causes the recording medium P to be reversed. The recording medium P held in a nip N2 between the printing cylinder 23 and the third heating cylinder 28 is conveyed to the nip N1 formed by the printing cylinder 23 and the first heating cylinder 22. At that time, the second side of the recording medium P is heated by the third heating cylinder 28. Thereafter, the recording medium P is conveyed toward the image former 30 by the printing cylinder 23 in a state where the front and back sides and the leading edge/trailing edge in the conveyance direction are reversed. Next, the controller 100 controls the image former 30 to form an image on the second surface of the recording medium P (step S108).

Next, the controller 100 controls the energy ray irradiator 40 to irradiate the second surface of the recording medium P on which the image is formed, with energy rays (step S109). The recording medium P irradiated with the energy rays is conveyed to the belt conveyor 29 via the first sheet ejection cylinder 24, the conveyance cylinder 25, and the second sheet ejection cylinder 26.

Next, the controller 100 controls the belt conveyor 29 to eject the recording medium P on which the image has been formed, to the sheet ejection tray 61 of the sheet ejector 60 (step S110).

Next, the control to heat each cylinder will be described with reference to FIGS. 4 to 6.

The controller 100 controls the heating by the second heating cylinder 21 on the basis of the room temperature or the information on the temperature of a predetermined recording medium. For example, the controller 100 controls the heating by the second heating cylinder 21 so that the second surface of the predetermined recording medium reaches a target temperature (for example, 40° C.). Note that the information on the temperature of the predetermined recording medium is acquired, for example, by measurement with the temperature sensor 13. The room temperature is acquired by, for example, being measured by a temperature sensor (not illustrated).

The controller 100 controls heating by the second heating cylinder 21 with reference to a temperature adjustment table T1 (see FIG. 4). The reason why the temperature adjustment table T1 is referred to is that it is not known how to adjust the temperature of the predetermined recording medium.

Next, after heating with reference to the temperature adjustment table T1, the controller 100 allows the temperature sensor 71 to detect the temperature of the second surface side of the predetermined recording medium. A detection result is fed back to the controller 100. The controller 100 adjusts the temperature of the second heating cylinder 21 on the basis of a difference between the target temperature and the detection result, so that the temperature of the second surface side of the predetermined recording medium reaches the target temperature.

For example, the unit price of one sheet of a special sheet such as film is expensive (e.g., 1000 yen/sheet). If the special sheets are passed in a state in which the temperature is not stable, the first several sheets become waste sheets, and the special sheets cannot be used. In this way, there is a problem in that the cost increases. Therefore, the controller 100 performs the above-described two-stage control in the case of passing the special sheets. This can suppress generation of waste to thereby prevent an increase in cost.

For example, when a coated sheet is passed, the controller 100 controls the temperature of the second heating cylinder 21 on the basis of the thickness of the coated sheet and the room temperature or the information on the temperature of the coated sheet. When an art sheet is passed, the controller 100 controls the temperature of the second heating cylinder 21 on the basis of the thickness of the art sheet and the room temperature or the information on the temperature of the art sheet. To be specific, the controller 100 controls the temperature of the second heating cylinder 21 so that the second surface of a predetermined recording medium (coated sheet or art sheet) reaches the target temperature (for example, 40° C.). For example, when a coated sheet having a thickness of 0.15 mm or less is passed at a room temperature of 16° C., the controller 100 controls so that the surface temperature of the second heating cylinder 21 reaches 51° C. (see FIG. 4). This makes it possible to bring the temperature of the second surface of the coated sheet under the above conditions close to 40° C.

On the other hand, when a high-quality sheet is passed, the controller 100 heats the second heating cylinder 21 so that the surface temperature of the second heating cylinder 21 can be maintained at 30° C. regardless of the temperature of the high-quality sheet. This is because when the cooled recording medium is repeatedly passed in contact with the second heating cylinder 21, the heat is removed and the surface temperature of the second heating cylinder 21 decreases. Therefore, the controller 100 controls the heater H1 to heat the second heating cylinder 21 so that the surface temperature of the second heating cylinder 21 can be maintained at 30° C. This can prevent a decrease in the surface temperature of the second heating cylinder 21.

The controller 100 controls heating by the first heating cylinder 22 with reference to a temperature adjustment table T2 (see FIG. 5).

For example, when a coated sheet is passed, the controller 100 controls the temperature of the first heating cylinder 22 on the basis of the thickness of the coated sheet and the room temperature or the information on the temperature of the coated sheet. When an art sheet is passed, the controller 100 controls the temperature of the first heating cylinder 22 on the basis of the thickness of the art sheet and the room temperature or the information on the temperature of the art sheet. To be specific, the controller 100 controls the temperature of the first heating cylinder 22 so that the first surface of a predetermined recording medium (coated sheet or art sheet) reaches a target temperature (for example, 45° C.). Furthermore, when the high-quality sheet is passed, the controller 100 controls the temperature of the first heating cylinder 22 on the basis of the thickness of the high-quality sheet and the room temperature or the information on the temperature of the high-quality sheet. To be specific, the controller 100 controls the temperature of the first heating cylinder 22 so that the first surface of the high-quality sheet reaches a target temperature (for example, 38° C.). For example, when the coated sheet having a thickness of 0.15 mm or less is passed at a room temperature of 16° C., the controller 100 controls so that the surface temperature of the first heating cylinder 22 reaches 63° C. (see FIG. 5). This makes it possible to bring the temperature of the first surface of the coated sheet under the above conditions close to 45° C.

The controller 100 controls heating by the second heating cylinder 21 on the basis of characteristics of a predetermined recording medium. Examples of the characteristics of the predetermined recording medium include a material, a basis weight, and thickness information of the recording medium. This is because, for example, the degree of temperature rise at the time of heating differs between a thin but heavy PET film and a thick and light sheet.

For example, a coated sheet having a basis weight of 158 gsm and a thickness of more than 0.15 mm has a low pulp density and a large amount of an air layer in a pulp layer, which makes it difficult for heat to escape. In the case of such a condition, the controller 100 controls to turn down the heating of the second heating cylinder 21 by the heater H1. FIG. 6 illustrates an example of a condition of the basis weight allowed in the normal control with respect to the thickness of the recording medium. The normal control is temperature control based on the temperature adjustment table T1. That is, when the basis weight of the predetermined recording medium is within the range of the condition shown in FIG. 6, the controller 100 performs the control according to the temperature adjustment table T1 with respect to the predetermined recording medium.

On the other hand, when the basis weight of the predetermined recording medium exceeds the range of the condition shown in FIG. 6, the controller 100 controls to multiply the surface temperature of the second heating cylinder 21 by 0.95. For example, the controller 100 controls the surface temperature of the second heating cylinder 21 to 51° C. (see FIG. 4)×0.95≈48° C. in the case of the coated sheet (coated layer is formed on each surface) having a thickness of 0.15 mm and a basis weight exceeding 158 gsm at a room temperature of 16° C.

The controller 100 controls heating by the first heating cylinder 22 on the basis of the characteristics of the recording medium P.

For example, when the basis weight of the recording medium P exceeds the range of the condition shown in FIG. 6, the controller 100 controls to multiply the surface temperature of the first heating cylinder 22 by 0.95. For example, the controller 100 controls the surface temperature of the first heating cylinder 22 to 63° C. (see FIG. 5)×0.95≈60° C. in the case of the coated sheet (coated layer is formed on each surface) having a thickness of 0.15 mm and a basis weight exceeding 158 gsm at a room temperature of 16° C.

The controller 100 controls the heat generation widths of the heaters H1 and H4 according to the width of the passing recording medium P. This makes it possible to heat the entire surface of the passing recording medium P passing. In addition, since it is possible to suppress the heating of the position where the recording medium P does not pass, it is possible to suppress the occurrence of temperature unevenness in which only the edge of the recording medium P has a high temperature. Therefore, it is possible to suppress occurrence of poor image quality due to temperature unevenness.

The controller 100 controls heating by the third heating cylinder 28 on the basis of the ink adhesion amount on the first surface of the recording medium P. This is because when the amount of ink ejected onto the recording medium P is large, the recording medium P is heated by the heat of the ink itself. In addition, when the ink adhesion amount on the recording medium P is large, the amount of heating by the energy ray irradiator 40 increases. That is, the controller 100 controls the heating by the third heating cylinder 28 because the temperature of the recording medium P varies depending on the ink adhesion amount of the recording medium P. To be specific, the controller 100 relatively reduces the heating temperature by the third heating cylinder 28 when the ink adhesion amount on the recording medium P is large. When the ink adhesion amount on the recording medium P is small, the controller 100 relatively increases the heating temperature by the third heating cylinder 28.

As described above, the inkjet recording apparatus 1 according to the present embodiment includes the conveyor (printing cylinder 23), the image former 30, and the feeder. The conveyor conveys a recording medium while carrying it. The image former 30 forms an image on the recording medium conveyed by the conveyor. The feeder feeds the recording medium to the conveyor. The feeder includes the first heater (first heating cylinder 22) and the second heater (second heating cylinder 21). The first heater heats the recording medium from the first surface side on which an image is formed. The second heater heats the recording medium from the second surface side opposite to the first surface.

Therefore, according to the inkjet recording apparatus 1 of the present embodiment, it is possible to heat the back surface of the image forming surface of the recording medium. This makes it possible to reduce heat transfer from the image forming surface, so that the sheet surface temperature can be stabilized while suppressing the occurrence of curling.

In addition, the second heater is arranged on the upstream side in the conveyance direction of the recording medium relative to the first heater.

Therefore, it is possible to heat the back surface of the image forming surface of the recording medium first. This makes it possible to further reduce heat transfer from the image forming surface, so that the sheet surface temperature can be further stabilized while further suppressing the occurrence of curling.

The inkjet recording apparatus 1 further includes the controller 100 for controlling heating by the first heater and the second heater.

Therefore, the heating amount of the recording medium can be controlled. This allows the sheet surface temperature to be stabilized more reliably.

In a case where an image is formed on a predetermined recording medium by the image former 30, the controller 100 starts control of heating by the second heater.

Therefore, in a special recording medium, heat transfer from the image forming surface can be reduced. This makes it possible to stabilize the sheet surface temperature while suppressing the occurrence of curling even when an image is formed on a special recording medium.

The controller 100 controls heating by the second heater on the basis of the room temperature or the information on the temperature of the predetermined recording medium.

Therefore, it is possible to control the heating amount by the second heater according to the room temperature or the temperature of the recording medium. This allows the sheet surface temperature to be stabilized more reliably.

The controller 100 controls heating by the second heater on the basis of the characteristics of the predetermined recording medium. The characteristics of the recording medium is at least one of a material, a basis weight, and thickness information of the recording medium.

Therefore, it is possible to control the heating amount by the second heater according to the type of recording medium or the like. This allows the sheet surface temperature to be stabilized more reliably.

The inkjet recording apparatus 1 further includes the reverser (sheet reverser 50) and the third heater (third heating cylinder 28). The reverser reverses the recording medium in which an image is formed on the first surface by the image former 30, and conveys the recording medium to the conveyor. The third heater heats, from the second surface side, the recording medium reversed by the reverser. The reverser conveys the recording medium heated by the third heater to the nip formed by the conveyor and the first heater. The recording medium conveyed to the first heater via the second heater has a longer contact distance with the first heater than the recording medium conveyed to the nip via the third heater.

Therefore, according to the inkjet recording apparatus 1 of the present embodiment, when the recording medium passes through the third heating cylinder 28, the recording medium can be slightly heated. In the case where the recording medium passes through the second heating cylinder 21, the recording medium can be heated gently over time, which makes it possible to suppress the occurrence of sheet distortion.

The inkjet recording apparatus 1 further includes the controller 100 for controlling heating by the first heater, the second heater and the third heater. The radiant heat sources (heaters H1 and H4) for heating the second heater and the third heater, respectively, are provided on the outer circumferential side of the second heater and the third heater. The controller 100 controls the heat generation width of the radiant heat source according to the width of the passing recording medium.

Therefore, it is possible to heat the entire surface of the passing recording medium. In addition, since it is possible to suppress the heating of the position where the recording medium does not pass, it is possible to suppress the occurrence of temperature unevenness in which only the edge of the recording medium has a high temperature. Therefore, it is possible to suppress occurrence of poor image quality due to temperature unevenness.

The controller 100 controls heating by the first heater on the basis of the characteristics of the recording medium.

Therefore, it is possible to control the heating amount by the first heater according to the type of the recording medium or the like. This allows the sheet surface temperature to be stabilized more reliably.

The controller 100 also controls heating by the third heater on the basis of the ink adhesion amount on the first surface of the recording medium.

Therefore, it is possible to control the heating by the third heating cylinder 28 with respect to the temperature fluctuation due to the ink adhesion amount. This allows the sheet surface temperature to be stabilized more reliably.

Although an embodiment of the present invention has been specifically described above, the present invention is not limited to the embodiments described above, and various modifications can be made without departing from the spirit and scope of the invention.

For example, although the second heating cylinder 21 is arranged on the upstream side in the conveyance direction relative to the first heating cylinder 22 in the embodiment described above, there is no limitation to this. For example, the second heating cylinder 21 that heats the second surface of the recording medium P may be arranged on the downstream side in the conveyance direction relative to the first heating cylinder 22 that heats the first surface.

In the embodiment described above, the inkjet recording apparatus has been described as an example of the image forming apparatus, but the present invention is not limited thereto. For example, the present invention may be applied to an image forming apparatus using an electrophotographic method or another method.

Although the processing when double-sided printing is instructed has been described as an operation example in the embodiment described above, but the present invention is not limited thereto. For example, the present invention may be applied to processing when single-sided printing is instructed. In this case, the controller 100 may cause the recording medium P on which an image is formed to be irradiated with energy rays and then directly ejected to the sheet ejection tray 61.

Although each of the heaters H1 to H4 is provided at the position facing each of the cylinders to be heated in the embodiment described above, the present invention is not limited thereto. The heaters H1 to H4 may be configured to be built in the respective cylinders to be heated.

Besides, the detailed configuration of each device constituting the inkjet recording apparatus and the detailed operation of each device can also be appropriately modified without departing from the spirit and scope of the present invention.

Although embodiments of the present invention have been described and illustrated in detail, the disclosed embodiments are made for purposes of illustration and example only and not limitation. The scope of the present invention should be interpreted by terms of the appended claims.

The entire disclosure of Japanese Patent Application No. 2023-084507 filed on May 23, 2023 is incorporated herein by reference in its entirety.

What is claimed is:

1. An image forming apparatus, comprising:
- a first sheet feeder that feeds a recording medium;
- a second sheet feeder that receives the recording medium fed by the first sheet feeder and feeds the recording medium;
- a conveyor that receives the recording medium fed by the second sheet feeder and conveys the recording medium while carrying the recording medium; and
- an image former that forms an image on the recording medium conveyed by the conveyor;
- wherein the second sheet feeder includes
- a first heater that heats the recording medium from a first surface side on which the image is formed, and
- a second heater that heats the recording medium from a second surface side opposite to the first surface.

2. The image forming apparatus according to claim 1, wherein the second heater is arranged on an upstream side in a conveyance direction of the recording medium relative to the first heater.

3. The image forming apparatus according to claim 2, further comprising:
- a reverser that reverses a recording medium in which an image is formed on the first surface by the image former, and conveys the recording medium to the conveyor; and
- a third heater that heats the recording medium reversed by the reverser from the second surface side;
- wherein the reverser conveys the recording medium heated by the third heater to a nip formed by the conveyor and the first heater, and
- the recording medium conveyed to the first heater via the second heater has a longer contact distance with the first heater than the recording medium conveyed to the nip via the third heater.

4. The image forming apparatus according to claim 3, further comprising:
- a hardware processor that controls heating by the first heater, the second heater, and the third heater,
- wherein radiant heat sources that heat the second heater and the third heater, respectively, are provided on an outer circumferential side of the second heater and the third heater, and
- the hardware processor controls a heat generation width of each of the radiation heat sources according to a width of the passing recording medium.

5. The image forming apparatus according to claim 4, wherein the hardware processor controls heating by the third heater on a basis of an ink adhesion amount on the first surface of the recording medium.

6. The image forming apparatus according to claim 1, further comprising: a hardware processor that controls heating by the first heater and the second heater.

7. The image forming apparatus according to claim 6, wherein the hardware processor starts control of heating by the second heater when an image is formed on a predetermined recording medium by the image former.

8. The image forming apparatus according to claim 7, wherein the hardware processor controls heating by the second heater on a basis of a room temperature or information on a temperature of the predetermined recording medium.

9. The image forming apparatus according to claim 7, wherein the hardware processor controls heating by the second heater on a basis of a characteristic of the predetermined recording medium.

10. The image forming apparatus according to claim 9, wherein the characteristic of the recording medium is at least one of a material, a basis weight, and thickness information of the recording medium.

11. The image forming apparatus according to claim 6, wherein the hardware processor controls heating by the first heater on a basis of a characteristic of the recording medium.

12. The image forming apparatus according to claim 11, wherein the characteristic of the recording medium is at least one of a material, a basis weight, and thickness information of the recording medium.

13. The image forming apparatus according to claim 1, wherein the first sheet feeder includes a sheet feeding tray and a medium feeder.

14. The image forming apparatus according to claim 1, wherein the first heater includes a first heating element and a first radiant heater that heats an outer side of the first heating element, the second heater includes a second heating element and a second radiant heater that heats an outer side of the second heating element, and the first heating element and the second heating element heat the recording medium.

15. The image forming apparatus according to claim 14, wherein the first heating element and the second heating element are heating cylinders.

* * * * *